United States Patent
Goswami et al.

(10) Patent No.: US 10,277,278 B2
(45) Date of Patent: Apr. 30, 2019

(54) CIRCUITS AND SYSTEMS FOR MULTIPLEXED ISOLATOR COMMUNICATION

(71) Applicant: Analog Devices, Inc., Norwood, MA (US)

(72) Inventors: Bikiran Goswami, Burlington, MA (US); Baoxing Chen, Westford, MA (US)

(73) Assignee: Analog Devices, Inc., Norwood, MA (US)

( * ) Notice: Subject to any disclaimer, the term of this patent is extended or adjusted under 35 U.S.C. 154(b) by 419 days.

(21) Appl. No.: 14/735,086

(22) Filed: Jun. 9, 2015

(65) Prior Publication Data
US 2016/0087780 A1    Mar. 24, 2016

Related U.S. Application Data

(60) Provisional application No. 62/054,825, filed on Sep. 24, 2014, provisional application No. 62/054,830, filed on Sep. 24, 2014.

(51) Int. Cl.
*H04J 3/00* (2006.01)
*H04B 5/00* (2006.01)
(Continued)

(52) U.S. Cl.
CPC ........... *H04B 5/0031* (2013.01); *H04B 5/005* (2013.01); *H04L 27/08* (2013.01); *H04L 47/825* (2013.01)

(58) Field of Classification Search
CPC .................................................. H04B 5/0031
See application file for complete search history.

(56) References Cited

U.S. PATENT DOCUMENTS

| 5,870,046 A | 2/1999 | Scott et al. |
| 5,952,849 A | 9/1999 | Haigh |

(Continued)

FOREIGN PATENT DOCUMENTS

KR    20080041140 A    5/2008

OTHER PUBLICATIONS

PCT International Search Report and Written Opinion for PCT/US2015/034982, dated Sep. 17, 2015, 16 pages.
(Continued)

*Primary Examiner* — Samina F Choudhry
(74) *Attorney, Agent, or Firm* — Wolf, Greenfield & Sacks, P.C.

(57) ABSTRACT

An embodiment of a communication system for transmitting and receiving data across an isolation barrier may include a communication circuit connected to an isolator at a first side of the isolation barrier, the communication circuit having a transmit circuit to drive a first data signal onto the isolator based on input data received by the communication circuit, a receive circuit to receive a second data signal from the isolator and produce output data based on the received second data signal, and a control circuit to control the transmit and receive circuits to provide time division multiplexing of the first and second data signals. The control circuit may transition to a transmit state in which the transmit circuit drives the first data signal onto the isolator from a receive state in which the receive circuit receives the second data signal from the isolator in response to detecting a condition as a function of receiving a predetermined number of bits of the second data signal and passage of a predetermined time period.

25 Claims, 7 Drawing Sheets

(51) Int. Cl.
*H04L 27/08* (2006.01)
*H04L 12/911* (2013.01)

(56) References Cited

U.S. PATENT DOCUMENTS

| | | | |
|---|---|---|---|
| 6,107,948 | A | 8/2000 | Scott et al. |
| 6,137,827 | A | 10/2000 | Scott et al. |
| 6,181,782 | B1 | 1/2001 | Sonoda |
| 6,191,717 | B1 | 2/2001 | Scott et al. |
| 6,225,927 | B1 | 5/2001 | Scott et al. |
| 6,249,171 | B1 | 6/2001 | Yaklin et al. |
| 6,297,755 | B2 | 10/2001 | Scott et al. |
| 6,385,235 | B1 | 5/2002 | Scott et al. |
| 6,389,061 | B1 | 5/2002 | Scott et al. |
| 6,389,063 | B1 | 5/2002 | Kanekawa et al. |
| 6,404,780 | B1 | 6/2002 | Laturell et al. |
| 6,570,513 | B2 | 5/2003 | Scott et al. |
| 6,611,553 | B1 | 8/2003 | Scott et al. |
| 6,928,158 | B1 | 8/2005 | Fraisse et al. |
| 7,088,803 | B2 | 8/2006 | Rahamim et al. |
| 7,135,789 | B2 | 11/2006 | Boros et al. |
| 7,154,940 | B2 | 12/2006 | Scott et al. |
| 7,155,352 | B2 | 12/2006 | Schoenborn |
| 7,203,224 | B2 | 4/2007 | Scott et al. |
| 7,277,491 | B2 | 10/2007 | Dong et al. |
| 7,348,809 | B2 | 3/2008 | Eldredge |
| 7,372,914 | B2 | 5/2008 | Calvin |
| 7,515,672 | B2 | 4/2009 | Dupuis et al. |
| 7,577,223 | B2 | 8/2009 | Alfano et al. |
| 7,629,813 | B2 | 12/2009 | Proebsting et al. |
| 7,701,731 | B2 | 4/2010 | Dhuyvetter et al. |
| 7,719,305 | B2 | 5/2010 | Chen |
| 7,737,871 | B2 | 6/2010 | Leung et al. |
| 7,738,568 | B2 | 6/2010 | Alfano et al. |
| 7,755,400 | B2 | 7/2010 | Jordanger et al. |
| 7,772,888 | B2 | 8/2010 | Ciccarelli et al. |
| 7,804,859 | B2 | 9/2010 | Landry et al. |
| 7,821,428 | B2 | 10/2010 | Leung et al. |
| 7,912,210 | B2 | 3/2011 | Fuehrer et al. |
| 8,049,573 | B2 | 11/2011 | Alfano et al. |
| 8,076,793 | B2 | 12/2011 | Robbins |
| 8,095,710 | B2 | 1/2012 | Landry et al. |
| 8,175,087 | B2 | 5/2012 | Jadus |
| 8,208,577 | B2 | 6/2012 | Calvin |
| 8,390,270 | B2 | 3/2013 | Cadoux et al. |
| 8,442,100 | B2 | 5/2013 | Giombanco et al. |
| 8,462,003 | B2 | 6/2013 | Ng et al. |
| 8,525,547 | B2 | 9/2013 | Gaalaas et al. |
| 8,571,093 | B1 | 10/2013 | Van de Beek |
| 8,629,714 | B2 | 1/2014 | Ng et al. |
| 8,634,216 | B2 | 1/2014 | Chapman |
| 8,736,343 | B2 | 5/2014 | Chen et al. |
| 8,829,955 | B1 | 9/2014 | Goswami |
| 8,847,503 | B2 | 9/2014 | Chang et al. |
| 8,867,182 | B2 | 10/2014 | Bark et al. |
| 8,928,383 | B2 | 1/2015 | Goswami et al. |
| 9,000,675 | B2 | 4/2015 | Chang et al. |
| 2003/0058499 | A1 | 3/2003 | Reingand et al. |
| 2004/0202204 | A1 | 10/2004 | Dong et al. |
| 2005/0077905 | A1 | 4/2005 | Sasaki |
| 2007/0003055 | A1 | 1/2007 | Bark et al. |
| 2007/0177679 | A1 | 8/2007 | Sovenyi |
| 2010/0250820 | A1 | 9/2010 | Gaalaas et al. |
| 2011/0085438 | A1 | 4/2011 | Jadus |
| 2013/0051291 | A1 | 2/2013 | Alamouti et al. |
| 2013/0195153 | A1 | 8/2013 | Pimentel et al. |
| 2013/0278438 | A1 | 10/2013 | Mueck |
| 2014/0028371 | A1 | 1/2014 | Fang et al. |
| 2014/0133197 | A1 | 5/2014 | Chapman |
| 2014/0270122 | A1 | 9/2014 | Lau et al. |
| 2014/0307759 | A1 | 10/2014 | Sundar et al. |
| 2016/0087914 | A1 | 3/2016 | Goswami et al. |

OTHER PUBLICATIONS

International Preliminary Report on Patentability dated Apr. 6, 2017 for Application No. PCT/US2015/034982.
Cantrell et al., "Isolating SPI for High Bandwidth Sensors", Technical Article MS-2689, Analog Devices, Inc., 2014, 6 pages.
Krakauer, "Anatomy of a Digital Isolator", Technical Article MS-2234, Analog Devices, Inc., Oct. 2011, 3 pages.
"3.75 kV, 7-Channel, SPIsolator Digital Isolators for SPI", Data Sheet ADuM3151/ADuM3152/ADuM3153, Analog Devices, Inc., 2014-2015, 22 pages.
Kugelstadt, T., "New digital, capacitive isolators raise the bar in high-performance," Texas Instruments, EE Times Design online date Apr. 6, 2010, pp. 1-5.

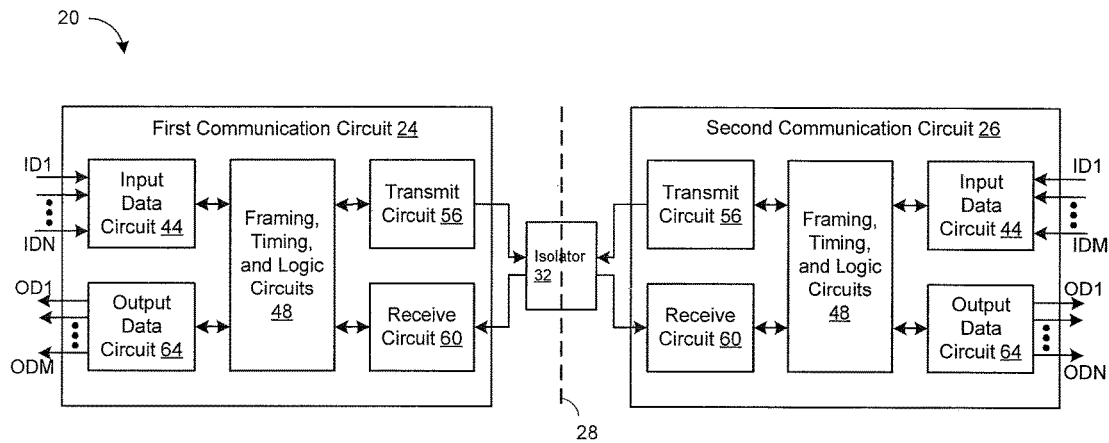
FIG. 1
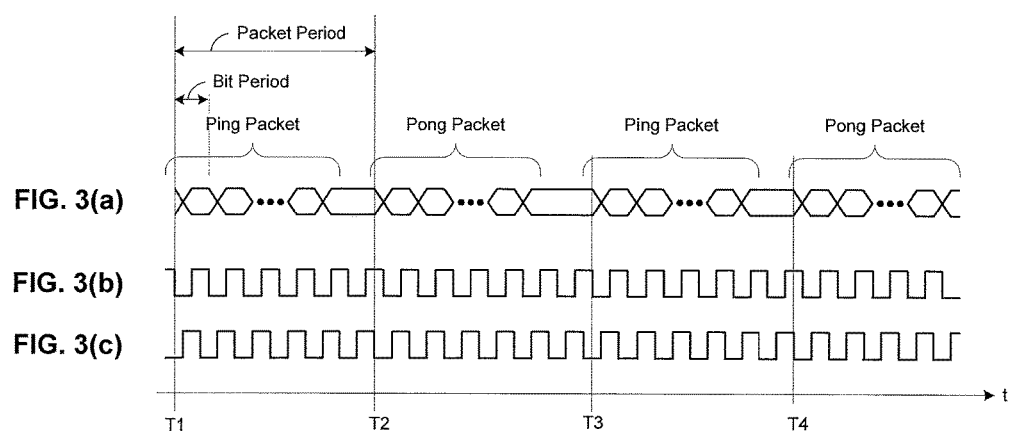
FIG. 3(a)
FIG. 3(b)
FIG. 3(c)

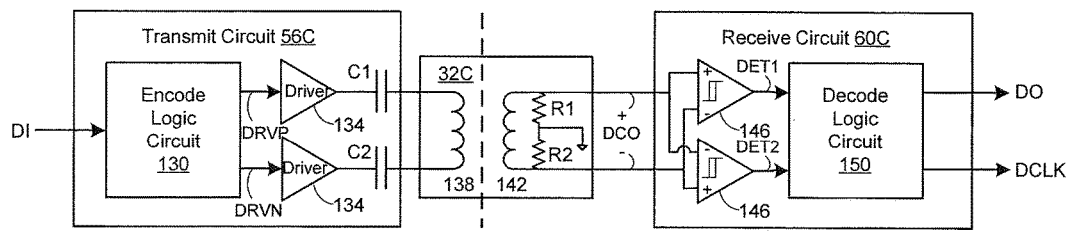
FIG. 4
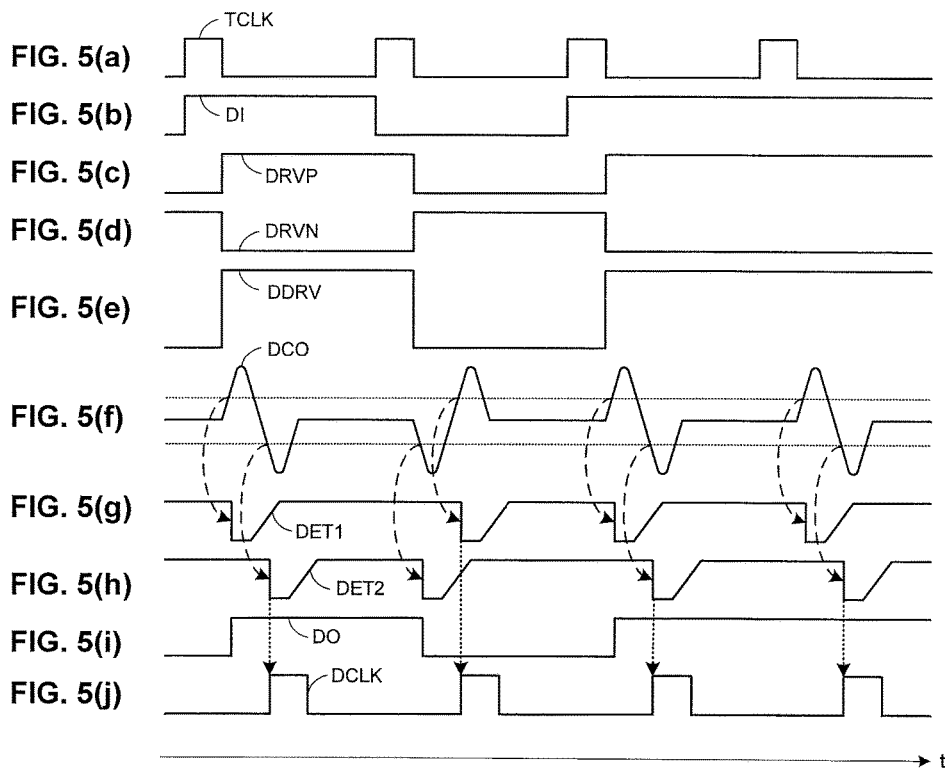

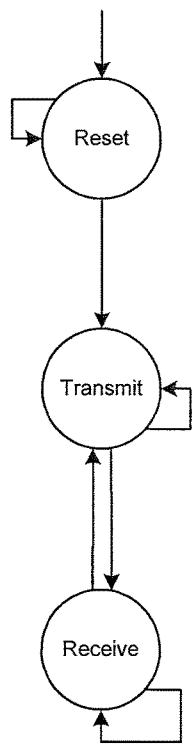 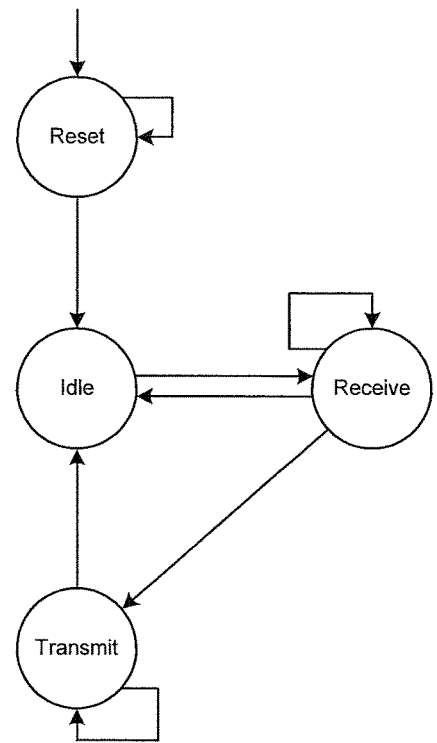
FIG. 6(a)  FIG. 6(b)
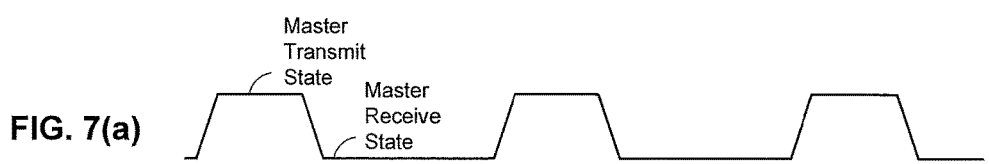 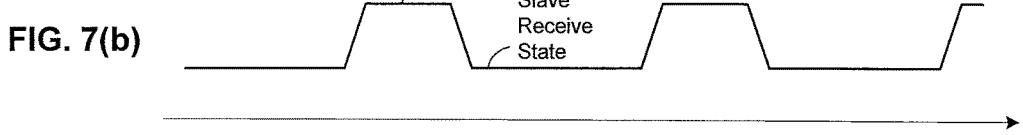
FIG. 7(a)
FIG. 7(b)

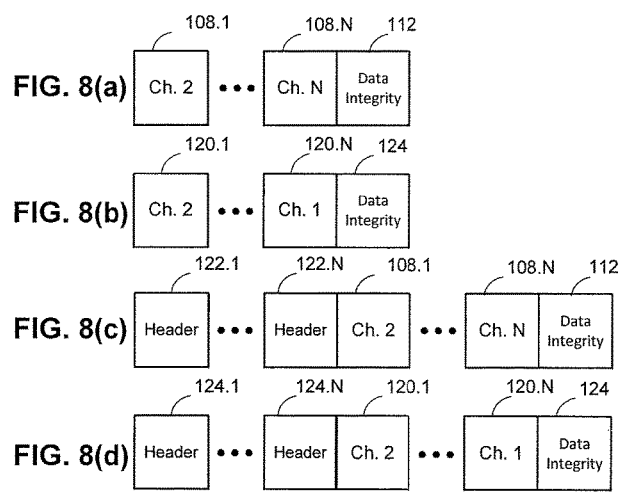
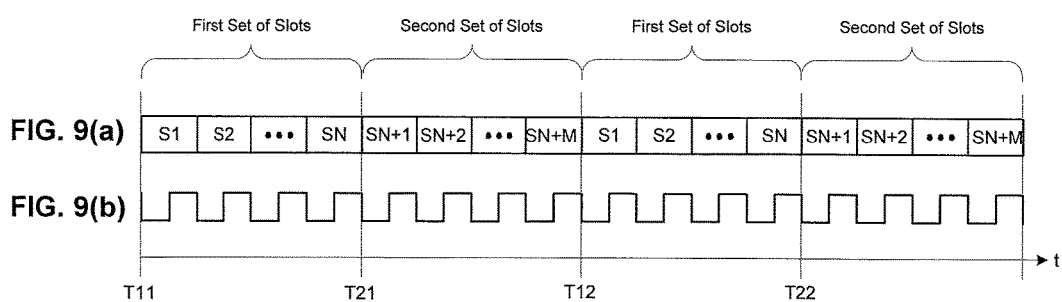

CIRCUITS AND SYSTEMS FOR MULTIPLEXED ISOLATOR COMMUNICATION

CROSS-REFERENCE TO RELATED APPLICATION

This application claims the benefit of U.S. Provisional Patent Application No. 62/054,825, filed on Sep. 24, 2014, and U.S. Provisional Patent Application No. 62/054,830, filed on Sep. 24, 2014, each of which is hereby incorporated by reference in its entirety.

BACKGROUND INFORMATION

Galvanic isolation may be implemented between electric systems and/or subsystems for a variety of reasons, including as related to performance and safety concerns. For example, an analog-to-digital converter may be isolated from other digital circuits to prevent voltage noise resulting from switching in those digital circuits from affecting performance metrics of the converter.

Previous isolation schemes have provided for communication of data between isolated systems using unidirectional isolator channels that deliver data in a single direction across an isolation barrier. While such unidirectional data flow between isolated systems is useful in some instances, it is problematic in other instances when communication of a data channel, or even multiple data channels, is desired in both directions between isolated systems without incurring the cost, area and/or complexity of maintaining separate unidirectional isolator channels and associated circuitry for both directions. Additionally, prior isolator channels have suffered from poor data communication rates even in a single direction across the isolation barrier.

Therefore, a need exists for circuits and systems that provide efficient communication across an isolation barrier between isolated systems.

BRIEF DESCRIPTION OF THE DRAWINGS

So that features of the present invention can be understood, a number of drawings are described below. However, the appended drawings illustrate only particular embodiments of the invention and are therefore not to be considered limiting of its scope, for the invention may encompass other equally effective embodiments.

FIG. 1 is a circuit schematic depicting an embodiment of a communication system.

FIGS. 3(a)-3(c) are signal diagrams depicting embodiments of signals of the communication system.

FIG. 4 is a circuit schematic depicting embodiments of a transmit circuit, an isolator, and a receive circuit of the communication system.

FIGS. 5(a)-5(j) are signal diagrams depicting embodiments of signals of the transmit circuit, isolator, and receive circuit of the communication system.

FIGS. 6(a)-6(b) are state diagrams depicting embodiments of states of master and slave state machines of the communication system.

FIGS. 7(a)-7(b) are signal diagrams depicting embodiments of transmit and receive state transition signals of the master and slave state machines.

FIGS. 8(a)-8(d) depict embodiments of data packets that may be communicated by the communication system.

FIGS. 9(a)-9(b) are timing and signal diagrams depicting embodiments of transmission time slot assignments and a corresponding clock signal of communication circuits of the communication system.

DETAILED DESCRIPTION OF EXAMPLE EMBODIMENTS

Figure 2:
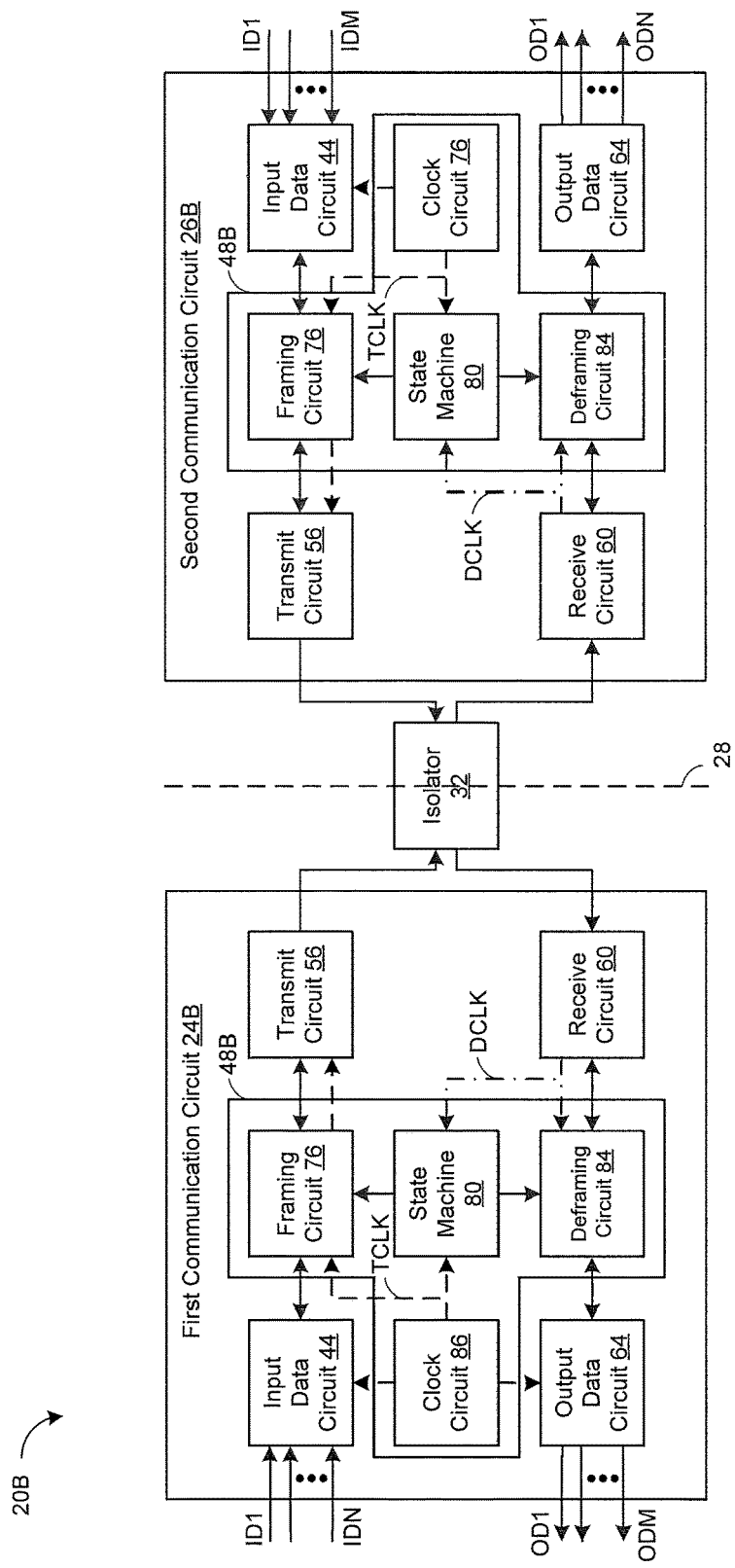
FIG. 2 is a circuit schematic depicting another embodiment of the communication system.

An embodiment of a communication system may provide multiplexed bidirectional data transmission across an isolation barrier using a single isolator. The communication system may include a communication circuit connected to the isolator on one side of the isolation barrier. A transmit module of the communication circuit may frame a plurality of input data signals into packets for transmission in a time division multiplexed manner across the isolation barrier using the isolator, and drive a first data signal representing the framed data packets onto the isolator according to the time division multiplexing. A receive module of the communication circuit may receive a second data signal from the isolator representing data packets received by the communication circuit according to the time division multiplexing, and deframe the received data packets into a plurality of output data signals.

The isolator may be a single isolator device having a single set of terminals for both driving the first data signal representing the transmitted data packets and providing the second data signal representing the received data packets. In one embodiment, the isolator may be a single inductive isolator device including a first coil on a first side of the isolation barrier and a second coil on a second side of the isolation barrier, the first coil having the set of terminals for both driving the first data signal and providing the second data signal, and the second coil having another set of terminals to perform a similar function on the second side of the isolation barrier.

The communication circuit may include a control circuit having a state machine operable to occupy and transition between a plurality of different states to control functionality of the communication circuit. For example, the state machine may have a transmit state in which the control circuit may control the transmit module to transmit data packets via the first data signal, and a receive state in which the control circuit may control the receive module to receive a second data packet via the second data signal, so as to provide the time division multiplexing of data signals in both directions across the isolation barrier using the isolator.

In one embodiment, the communication circuit may provide a "ping-pong" time division multiplexing of the transmitted and received data packets. To provide the ping-pong time division multiplexing, the state machine may transition from the transmit state to the receive state after transmitting a predetermined number of symbols of the transmit data packet or after a predetermined time period has elapsed since entering the transmit state, and transition from the receive state to the transmit state after receiving a predetermined number of symbols of the receive data packet or after a predetermined time period has elapsed since entering the receive state.

During ping-pong time division multiplexing, the communication circuit may transmit and receive data packets according to respective asynchronous clock signals. The transmit module may transmit data packets across the isolator according to a transmit clock signal. The receive module may receive data packets from the isolator according to a clock signal derived from the received data signal, which may be asynchronous to the transmit clock signal.

The ping and pong packets may be of equal or different respective bit lengths. In one embodiment, the communication circuits may dynamically size the ping and/or pong packets during operation, and communicate the dynamically set packet bit length to the other communication circuit, such as by including an indication of the dynamically set predetermined number of bits of the packet in a header of that packet, for use by the other communication circuit in evaluating whether the receive condition has been satisfied. Similarly, the communication circuits also may dynamically set the predetermined time period associated with receipt of ping and/or pong packets, and used to evaluate whether the receive condition has been satisfied, based on the bit length of the packet to be received.

In another embodiment, the communication circuit may provide a slotted time division multiplexing of the transmitted and received data packets in which the transmit module may transmit the first data signal during a periodically repeating first set of assigned time slots and the receive module to receive the second data signal during a periodically repeating second set of assigned time slots.

In embodiments, in addition to or alternatively to time division multiplexing, the communication circuit may multiplex a plurality of bits of data into each pulse or other single data symbol transmitted across the isolation barrier according to one or more of amplitude, frequency or phase multiplexing. In one embodiment, to provide amplitude multiplexing, the transmit module may multiplex a plurality of bits of the framed transmit data packet into an amplitude of a pulse or other symbol driven as the first data signal onto the isolator. The receive module may likewise demultiplex a plurality of bits of a data packet from an amplitude of a pulse or other symbol received across the isolator. In another embodiment, to provide frequency multiplexing, the transmit module may multiplex a plurality of bits of the framed transmit data packet into a frequency of an oscillation or other symbol driven as the first data signal onto the isolator, and the receive module may demultiplex a plurality of bits of a data packet from a frequency of an oscillation or other symbol received across the isolator. In yet another embodiment, to provide phase multiplexing, the transmit module may multiplex a plurality of bits of the framed transmit data packet into a phase of an oscillation or other symbol driven as the first data signal onto the isolator, and the receive module may demultiplex a plurality of bits of a framed receive data packet from a phase of an oscillation or other symbol received across the isolator.

FIG. 1 depicts an embodiment of a communication system 20 for providing multiplexed bi-directional data communication across an isolation barrier between isolated systems using a single isolator 32. The communication system may include a first communication circuit 24, a second communication circuit 26, an isolator 32, and an isolation barrier 28.

The first and second communication circuits 24, 26 may be located on different sides of the isolation barrier 28, with the first communication circuit 24 located on a first side of the isolation barrier 28 and the second communication circuit 26 located on a second side of the isolation barrier 28.

The first and second communication circuits 24, 26 each may include a transmit module and a receive module. The transmit module may include an input data circuit 44, a framing, timing and logic circuit 48, and a transmit circuit 56. The input data circuit 44 may be coupled to one or more data sources to receive one or more input data signals ID1 . . . IDN, ID1 . . . IDM from the sources. The framing, timing and logic circuit 48, also referred to herein as a control circuit 48, may be coupled to the input data circuit 44 to receive, frame and provide the input data to the transmit circuit 56. The transmit circuit 56 may be coupled to the isolator 32 to drive the isolator 32 to transmit data across the isolation barrier 28 to the other communication circuit. The receive module may include an output data circuit 64, the framing, timing and logic circuit 48, and a receive circuit 60. The receive circuit 60 may be coupled to the isolator 32 to receive data transmitted across the isolation barrier 28 from the other communication circuit. The framing, timing and logic circuit 48 may be coupled to the receive circuit 60 to receive, deframe and provide output data to the output data circuit 64. The output data circuit 64 may be coupled to one or more data sinks to provide one or more output data signals OD1 . . . ODM, OD1 . . . ODN to the sinks.

The isolator 32 may be a single isolator device having components on both sides of the isolation barrier 28 and being coupled to both the transmit and receive circuits 56, 60 in each of the first and second communication circuits 24, 26 to provide bi-directional communication across the isolation barrier 28. The single isolator device may be a single inductive isolator device having a first coil including a first pair of terminals coupled to both the transmit and receive circuits 56, 60 on a first side of the isolation barrier 28 and a second coil having a second pair of terminals to be coupled to both the transmit and receive circuits 56, 60 on a second side of the isolation barrier 28. Alternatively, the isolator device may be one or more of a capacitive isolator device such as a capacitor, a magnetic isolator device such as a giant magnetoresistance based isolator device, or an optical isolator device such as an optocoupler.

The isolation barrier 28 may include one or more layers of material to provide galvanic isolation between first and second isolated systems containing the first and second communication circuits 24, 26, respectively, on either side of the isolation barrier 28. The isolation barrier 28 may include one or more layers of material to provide the galvanic isolation between the first and second isolated systems.

The communication system 20 may provide the bi-directional data communication across the isolation barrier 28 using the single isolator 32 according to time division multiplexing. The time division multiplexing may include alternating responsive packets from each communication circuit 24, also referred to herein as a "ping-pong" time division multiplexing.

FIG. 2 depicts an embodiment of the communication system 20B configured to provide bi-directional communications across the isolation barrier according to a ping-pong time division multiplexing. The depicted embodiment of the communication system may include embodiments of the first communication circuit 24B, second communication circuit 26B, isolator 32, and isolation barrier 28.

The input data circuits 44 of the first and second communication circuits 24B, 26B each may receive the input data signals ID1 . . . IDN, ID1 . . . IDM from the one or more input data sources. The input data sources may optionally each represent a respective separate input data channel. The input data circuits 44 each may include a glitch filtering and input synchronization circuit to receive the data signals ID1 . . . IDN, ID1 . . . IDM from the data sources asynchronously or loosely synchronized and provide input data corresponding to the received input data signal synchronous to at least one clock signal TCLK from a clock circuit of the respective communication circuit.

The framing, timing and logic circuits 48B each may include a framing circuit 76, a state machine 80, a deframing circuit 84, and a clock circuit 86. The framing circuit 76 may receive the input data from the input data circuit 44 and frame an input data packet multiplexed from the received input data signals for transmission by the transmit circuit 56 under control of the state machine 80 and according to the at least one clock signal TCLK from the clock circuit 86. The state machine 80 may determine a communication state of the respective communication circuit 24 and control the framing and deframing circuits 76, 84 according to the determined communication state. The deframing circuit 84 may receive and deframe data packets received by the receive circuit 60 into constituent demultiplexed output data for provision to the output data circuit 64 under control of the state machine 80 and according to a clock signal DCLK derived from the data signals received by the receive circuit 60. The clock circuit 86 may provide the at least one transmit clock signal TCLK delivered to the input data circuit 44, framing circuit 76, state machine 80 and transmit circuit 56. The clock circuit 86 may include a clock signal generator to generate the at least one transmit clock signal TCLK.

The transmit circuits 56 each may serially encode and drive bits of the framed data packets onto the isolator 32 as pulses or other signals for transmission to the other communication circuit. The receive circuits 56 each may serially receive and decode transmitted pulses or other signals from the isolator 32 to generate received data packets.

The output data circuits 64 each may provide the demultiplexed output data from the deframing circuit 84 as output data signals OD1 . . . ODM, OD1 . . . ODN to one or more output data sinks. The output data sinks each may optionally represent a respective separate output data channel.

The communication system 20B may operate according to transmit and receive states established by their respective state machines to provide ping-pong time division multiplexed bidirectional data communication across the isolator 32. In the ping-pong data communication, one of the communication circuits may operate as a master communication circuit and the other communication circuit may operate as a slave communication circuit. The master communication circuit may enter and operate according to a transmit state of its state machine to send a first data packet, or a "ping" packet, including a predetermined number of bits or symbols, to the other of the communication circuits. The slave communication circuit may enter and operate according to a receive state of its state machine to during transmission of the ping packet by the master communication circuit to refrain from transmitting any data and receive the ping packet. Satisfaction of a receipt condition as detected by the slave communication circuit may trigger the slave communication circuit to transition to a transmit state to send a second data packet, or a "pong" packet, including a respective predetermined number of bits or symbols, back to the master communication circuit. Detecting of the receipt condition by the slave communication circuit may include detecting either receipt of the expected predetermined number of bits or symbols of the ping packet or passage of a predetermined amount of time without having yet received the expected predetermined number of bits or symbols. During transmission of the pong packet by the slave communication circuit, the master communication circuit may enter and operate according to a receive state to refrain from transmitting any data and receive the pong packet. Satisfaction of a receipt condition as detected by the master communication circuit may then trigger the master communication circuit to transition back to the transmit state and another round of ping-pong packet transmission may proceed. Detecting of the receipt condition by the master communication circuit may again include detecting either receipt of the expected predetermined number of bits or symbols of the pong packet or passage of a predetermined amount of time without having yet received the expected predetermined number of bits or symbols. This ping-pong packet transmission may continue until disengaged by the communication system.

FIGS. 3(*a*)-3(*c*) are signal diagrams depicting embodiments of data and clock signals for an exemplary ping-pong data packet communication across the isolation barrier 28.

FIG. 3(*a*) depicts a representation of bidirectional data flow across the isolator 32. At time T1, the communication circuit acting as the master communication circuit may operate in a transmit state of its state machine to transmit a first data packet, i.e., a first ping packet. The transmit circuit 56 of the master communication circuit may transmit each of a predetermined number of bits or symbols of the framed ping packet as pulse(s) or other signals in a serial fashion at bit period intervals. The framing, timing and logic circuit 48B, e.g., the state machine 80, of the master communication circuit may select the time T1 and the bit period as a function of the overall operational context of the communication system.

At time T2, upon satisfaction of the receipt condition as detected by the communication circuit acting as the slave communication circuit, this slave communication circuit may transition from a receive state to a transmit state of its state machine to transmit a second data packet, i.e., a first pong packet, in response to completely receiving the first ping packet. The transmit circuit of the slave communication circuit may transmit each of a respective predetermined number of bits or symbols of the framed pong packet as pulse(s) or other signals in serial fashion at bit period intervals. The framing, timing and logic circuit 48B, e.g., the state machine 80, of the slave communication circuit may select the time T2, the corresponding bit periods, and the separation of the time T2 from the time T1, or the corresponding packet period, to ensure error free ping-pong operation under a variety of conditions.

At times T3 and T4, the master and slave communication circuits may transmit a second ping packet and a second pong packet, respectively. The framing, timing and logic circuit, e.g., the state machine, of the master communication circuit may select the time T3 and the separation of the time T3 from the time T2, or the corresponding packet period, to again ensure error free ping-pong operation under a variety of conditions.

The first and second communication circuits 24B, 26B may operate according to asynchronous transmit and receive clocks to provide the bidirectional ping-pong data communication. Each of the communication circuits 24B, 26B may provide its own transmit clock signal independently from the other communication circuit to provide a time base to frame and transmit data packets and transition among communication states. For example, the master communication circuit may include a clock circuit to provide a master transmit clock signal independently from the slave communication circuit. The master communication circuit may frame and transmit the ping data packets, and transition from a transmit state to a receive state, as a function of the master transmit clock signal. Similarly, the slave communication circuit may include a clock circuit provide a slave transmit clock signal independently from the master communication circuit. The slave communication circuit may frame and transmit the pong data packets, and transition from a transmit state to a receive state, as a function of the slave transmit clock signal.

FIG. 3(b) depicts a representation of an exemplary master transmit clock signal used by the master communication circuit to frame and transmit the ping data packets. As may be seen, the bits of the ping data packet may be transmitted in alignment to pulses of the master transmit clock signal, such as to falling edges of the master clock signal. FIG. 3(c) depicts a representation of an exemplary slave transmit clock signal used by the slave communication circuit to frame and transmit the ping data packets. As may be seen, the bits of the ping data packet are transmitted in alignment to pulses of the slave transmit clock signal, such as to falling edges of the slave clock signal.

Operation of the first and second communication circuits 24B, 26B to transmit data in synchronization with a respective transmit clock TCLK that may be asynchronous to the transmit clock TCLK of the other of the communication circuits may advantageously enable the communication circuits to forgo mutual synchronization of their transmit clocks in embodiments in which such asynchronous operation is utilized.

The first and second communication circuits 24B, 24B also each may derive a clock signal DCLK from the data signals that it receives from the other communication circuit, to provide a time base to deframe the received data and transition among communication states, that may be asynchronous to the transmit clock of that communication circuit. For example, the slave communication circuit may derive a clock signal from the ping data packets that it receives from the master communication system. The slave communication system may deframe the ping data packets and/or transition from a receive to a transmit state as a function of this derived clock signal. The derived clock signal generated by the slave communication circuit may be asynchronous to the transmit clock of the slave communication circuit. Similarly, the master communication circuit may derive a clock signal from the pong data packets that it receives from the slave communication system. The master communication system may deframe the pong data packets and/or transition from a receive to a transmit state as a function of this derived clock signal. The derived clock signal generated by the master communication circuit may be asynchronous to the transmit clock of the master communication circuit.

The clock signal derived from the received data may be generated in different ways. In one embodiment, e.g., as discussed below in regard to FIGS. 4 and 5(a)-5(j), the communication circuits may generate the derived clock signal on a continuous basis from each bit or symbol of the data signal or signals that it receives from the other communication circuit. Such a derived clock signal may represent a time base that continuously adapts according to each bit or symbol of the received data signal. In another embodiment, the communication circuits may generate the derived clock signal from a subset of the bits or symbols of the data signal or signals that it receives from the other communication circuit. In one such scenario, the communication circuits may include a phase-locked-loop to generate the derived clock signal by locking onto a specific subset of the bits or symbols of the received data signals, such as a specific header bit or symbol or sequence of header bits or symbols of the received data signal. Such a derived clock signal may represent a time base that adapts according to only the subset of the bits or symbols of the received data signals.

FIG. 4 depicts exemplary embodiments of the transmit circuit 56C, isolator 32C, and receive circuit 60C of the communication system 20.

The transmit circuit 56C may include an encode logic circuit 130, a pair of differential driver circuits 134, and a pair of capacitors C1, C2. The encode logic circuit 130 may encode bits of the framed packet received from the framing circuit 76 into a signal form for being driven onto the isolator 32C. The encode logic circuit 130 may receive the framed packet as a serial bit stream from the framing circuit 76, and output the encoded bits as a differential driver input signal DDRV, in synchronization with the communication circuit's transmit clock signal TCLK. The driver circuits 134 may drive the encoded data signal onto the isolator 32C for transmission across the isolation barrier 28 to the other communication circuit. The driver circuits 134 may receive the encoded signals DRVP, DRVN from the encode logic circuit, and generate a differential drive signal, via the pair of capacitors C1, C2, at terminals of the first coil 138 of the isolator 32C, in synchronization with the communication circuit's generated or received clock signal TCLK.

In the depicted embodiment, the isolator 32C may be an inductive isolator device 32C. The inductive isolator device 32C may include the first coil 138 on a first side of the isolation barrier 28, a second coil 142 on a second side of the isolation barrier, the isolation barrier 28, and a pair of load resistors R1, R2 on the second side of the isolation barrier 28. The load resistors R1, R2 optionally may instead be incorporated as impedances or other circuit elements of the receive circuit 60C. The isolator 32C may communicate the data signal driven at an input to the first coil 138 to an output at the second coil 142. The first coil 138 of the isolator 32C may be driven by the differential drive signal generated at its terminals by the driver circuits 134, via the capacitors C1, C2, to produce a differential coil output signal DCO at the terminals of the second coil 142 and across the load resistors R1, R2 as a result of inductive coupling between the first and second coils 138, 142.

The receive circuit 60C may include a pair of comparators 146 and a decode logic circuit 150. The receive circuit 60C may generate output data as a function of the signals received at the output of the isolator 32C. The receive circuit 60C also may generate the clock signal DCLK derived from the signals received at the output of the isolator. The pair of comparators 146 may receive the differential coil output signal DCO cross coupled to differential input terminals to generate a pair of detection signals DET1, DET2 having pulses indicating transitions between high and low voltages in the differential coil output signal DCO. The decode logic circuit 150 may receive the pair of detection signals DET1, DET2 and generate the output data packet and the clock signal DCLK derived from the received data signals.

FIGS. 5(a)-5(j) are signal diagrams depicting embodiments of data and clock signals of the transmit circuit 56C, isolator 32C, and receive circuit 60C depicted in FIG. 4 for an exemplary data transmission across the isolation barrier 28.

FIG. 5(a) depicts an exemplary transmit clock signal TCLK generated or received by the clock circuit 86 of the transmitting communication circuit. FIG. 5(b) depicts an exemplary framed data packet signal DI delivered to the encode logic circuit 130 by the framing circuit 76. FIGS. 5(c) and 5(d) depict exemplary positive and negative driver input signals DRVP, DRVN, and FIG. 5(e) depicts an exemplary differential driver input signal DDRV representing a differential combination of the positive and negative driver input signals DRVP, DRVN, generated by the encode logic circuit 130 based on the received data packet signal DI.

FIG. 5(f) depicts an exemplary differential coil output signal DCO generated at the output of the isolator 32C in response to the isolator 32C being driven by the driver circuits 134 based on the differential driver input signal DDRV. The depicted differential coil output signal DCO shows a positive pulse followed by a negative pulse for a positive transition of the differential driver input signal DDRV, and a negative pulse followed by a positive pulse for a negative transition of the differential driver input signal DDRV.

FIG. 5(g) depicts an exemplary first detection signal DET1 generated at the output of the upper comparator 146 indicating detection of a positive pulse in the differential coil output signal DCO, and FIG. 5(h) depicts an exemplary second detection signal DET2 generated at the output of the lower comparator 146 indicating detection of a negative pulse in the differential coil output signal DCO. The comparators 146 may generate the first and second detection signals DET1, DET2 as a function of the differential coil output signal DCO and hysteresis characteristics of the comparators 146.

FIG. 5(i) depicts an exemplary output data packet signal DO generated by the decode logic circuit 150, representing the received data packet corresponding to the transmitted data packet, based on the first and second detection signals DET1, DET2. FIG. 5(j) depicts an exemplary clock signal DCLK derived by the receiving communication circuit as a function of the first and second detection signals DET1, DET2, for use by one or more of the deframing circuit 84 and state machine 80 for processing the received data packet.

Operation of the communication circuits 24B, 26B to receive, deframe and output data in synchronization with a clock DCLK derived from the received data that may be asynchronous to the transmit clock TCLK of that communication circuit may advantageously enable the communication circuits to forgo synchronization of their clocks in embodiments in which such asynchronous operation is utilized.

Other embodiments of the transmit circuit 56, isolator 32, and receive circuit 60, which perform the function of these circuits as discussed herein, may include circuit configurations and specific operation and associated waveforms that differ from those depicted in and discussed above in regard to FIGS. 4 and 5(a)-5(j).

The state machines 80 of the communication circuits 24B, 26B may operate to occupy and transition between a plurality of different states in response to conditions experienced by the respective communication circuit. The control circuit may provide control for the communication circuits in the states of the state machine 80 to provide the functionality of the communication circuits discussed herein.

In embodiments in which the first and second communication circuits 24B, 26B operate to provide the bidirectional ping-pong data communication, at any given time one of the first or second communication circuits 24B, 26B may be designated and operate as a master communication circuit and the other of the communication circuits may be designated and operate as a slave communication circuit. The corresponding state machine 80 of the master communication circuit may be designated and operate as a master state machine, and the corresponding state machine 80 of the slave communication circuit may be designated and operate as a slave state machine.

The initial assignment of the first and second communication circuits 24B, 26B as master or slave communication circuits may be performed in different ways. The first and second communication circuits 24B, 26B may be pre-programmed to operate as master or slave communications systems upon startup, such as by having this assignment pre-programmed into fixed logic or an electrically programmable non-volatile memory of the state machines 80 or other circuits. Alternatively, the initial assignment of the first and second communication circuits 24B, 26B as master or slave communications circuits may be in response to a command, such as may be delivered to the first and second communication circuit 24B, 26B from an outside source, or in response to a detected operating condition, such as in response to one of the communication circuits determining prior to the other that it needs to transmit data. The first and second communication circuits 24B, 26B also may be pre-programmed to respond to such commands with a different response times to avoid any indeterminate conditions that may result from the communication circuits receiving such commands substantially simultaneously.

Changing an initial assignment of the first and second communication circuits 24B, 26B as master or slave communication circuits may also be performed in different ways. The assignment may be changed in response to a command, such as delivered to the first or second communication circuits 24B, 26B from an outside source, or in response to detected operating conditions. The changeover may include communicating the assignment change from the existing master communication circuit to the slave communication circuit, such as by utilizing the master slave select bit discussed below.

FIGS. 6(a) and 6(b) depict embodiments of state diagrams of the master and slave state machines, respectively. In FIG. 6(a), the states of the master state machine may include a reset state, a transmit state, and a receive state. The master reset state may be entered upon startup of the master communication circuit or from another state in response to receipt of a reset command from within or by the master communication circuit, such as to either reset operation of the master state machine or to transition to operation of a state machine 80 as a master state machine from operation as a slave state machine. The master reset state may be maintained until a predetermined time period has elapsed or a command to enter a transmit state is received.

The master transmit state may be entered from the reset state in response to a command to enter the transmit state, e.g., either upon a predetermined time passing after entering the reset state or in response to a transmit command from within or by the master communication circuit, at which time transmission of the ping packet may begin. The master transmit state may be maintained until a transmit condition has been satisfied as detected by the master communication circuit. Detecting satisfaction of the transmit condition may include detecting that each of the predetermined number of bits or symbols of the ping packet have been transmitted or that a predetermined period of time has passed without the predetermined number of bits or symbols of the ping packet having been transmitted. The master transmit state may be exited to the receive state in response to detecting satisfaction of the transmit condition.

The master receive state may be entered from the transmit state in response to detecting satisfaction of the transmit condition, at which time receipt of the pong packet may begin. The master receive state may be maintained until a receive condition has been satisfied as detected by the master communication circuit. Satisfaction of the receive condition may be detected by detecting that each of the respective predetermined number of bits or symbols of the pong packet have been received or that a respective predetermined period of time has passed since entering the receive state (e.g., without the predetermined number of bits or symbols of the pong packet having been received). The predetermined time period may be selected to be greater than a slowest total packet transmission time expected of the slave communication circuit operating according to its transmit clock signal. The master receive state may be exited to the transmit state in response to detecting satisfaction of the receive condition.

In FIG. 6(b), the states of the slave state machine may include a reset state, an idle state, a receive state, and a transmit state. The slave reset state may be entered upon startup of the slave communication system or from another state in response to receipt of a reset command from within or by the slave communication system, such as to either reset operation of the slave state machine or to transition to operation of a state machine 80 as a slave state machine from operation as a master state machine. The slave reset state may be maintained until a predetermined time period has elapsed or a command to enter an idle state is received.

The slave idle state may be entered from the reset state in response to a command to enter the idle state, e.g., either upon a predetermined time passing after entering the reset state or in response to a command from within or by the slave communication circuit, upon which the slave state machine idles. The slave idle state may be maintained while no activity in the slave-side coil of the isolator is detected. The slave idle state may be exited to the receive state in response to slave-side coil activity being detected.

The slave receive state may be entered from the idle state in response to slave-side coil activity being detected, upon which receipt of the ping packet may begin. The slave receive state may be maintained until a receive condition has been satisfied as detected by the slave communication circuit. Satisfaction of the receive condition may be detected by detecting that each of the predetermined number of bits or symbols of the ping packet have been received or that a predetermined period of time has passed since entering the receive state (e.g., without the predetermined number of bits or symbols of the ping packet having been received). The predetermined time period may be selected to be greater than a slowest total packet transmission time expected of the master communication circuit operating according to its transmit clock signal. The slave receive state may be exited to the transmit state in response to detecting satisfaction of the receive condition. The slave receive state may be exited back to the idle state in response to a receive timeout condition occurring, such as in which the bit period between expected ping packet bits exceeds a predetermined time period. The predetermined time period may be selected to be greater than a slowest bit period expected from the master communication circuit operated according to its internally generated clock signal.

The slave transmit state may be entered from the receive state in response to detecting satisfaction of the receive condition, upon which transmission of the pong packet may begin. The slave transmit state may be maintained until a transmit condition has been satisfied as detected by the slave communication circuit. Detecting satisfaction of the transmit condition may include detecting that each of the predetermined number of bits or symbols of the pong packet have been transmitted or that a predetermined period of time has passed without the predetermined number of bits or symbols of the pong packet having been transmitted. The slave transmit state may be exited to the idle state in response to detecting satisfaction of the transmit condition.

The transitions between transmit and receive states in the master and slave state machines may be controlled to produce an overlap in the receive states of the master and slave state machines to prevent the master and slave communication circuits from both attempting to drive the isolator 32 to transmit data across the isolation barrier 28 at the same time in embodiments where this may not be desired.

FIGS. 7(a) and 7(b) depict embodiments of signals controlling transitions between the transmit and receive states in the master and slave state machines, respectively. The transition from the transmit state to the receive state in the master state machine may occur substantially immediately after completing transmission of a ping packet, but the transition of from the receive state to the transmit state of the slave state machine may be delayed until after a predetermined time elapses after receipt of the ping packet has completed, to allow for a slowest expected state transition of circuits in the master communication circuit. Similarly, the transition from the transmit state to receive state in the slave state machine may occur substantially immediately after completing of transmission of a pong packet, but the transition from the receive state to the transmit state in the master state machine may be delayed until after a predetermined time elapses after receipt of the pong packet has completed, to allow for a slowest expected state transition of circuits in the slave communication system.

The communication system 20 may be used to perform bidirectional communication of a variety of different types of data across the isolation barrier 28. For example, the communication system 20 may perform bidirectional communication of Serial Peripheral Interface (SPI) data. The first and second communication circuits 24, 26 also may frame data packets for transmission having a fixed packet structure, such as a fixed packet structure for packets travelling in both directions between the first and second communication circuits 24, 26 or a first fixed packet structure for packets travelling in one directions between the first and second communication circuits 24, 26 and a different second fixed packet structure for packets travelling in the other direction, or a variable packet structure format.

FIGS. 8(a)-8(d) depict embodiments of data packets framed by the communication circuits 24, 26. FIGS. 8(a)-8(b) depict embodiments of data packets framed by the communication circuits 24, 26 according to a fixed packet structure. FIG. 8(a) depicts an embodiment of a data packet framed by the first or second communication circuits 24, 26 acting as the master communication circuit. The data packet may include one or more input data bits 108.1 . . . 108.N corresponding to one or more of the input data sources, and one or more data integrity bits 112. FIG. 8(b) depicts an embodiment of a data packet framed by the first or second communication circuits 24, 26 acting as the slave communication circuit. The data packet may include one or more input data bits 120.1 . . . 120.N corresponding to one or more of the input data sources, and one or more data integrity bits 124.

FIGS. 8(c)-8(d) depict embodiments of data packets framed by the communication circuits 24, 26 according to a variable packet length. A receiving communication circuit may detect the length of the received packet in different ways, such as by detecting predetermined header or ending sequence. FIG. 8(c) depicts an embodiment of a data packet framed by the first or second communication circuits 24, 26 acting as the master communication circuit. The data packet may include, in addition to one or more of the bits discussed above in connection with FIG. 8(a), one or more header bits 120.1 ... 120.N communicating the length and/or content of the data packet. FIG. 8(d) depicts an embodiment of a data packet assembled by one of the first or second communication circuits 24, 26 acting as the slave communication system. The data packet may include, in addition to one or more of the bits discussed above in connection with FIG. 8(b), one or more header bits 124.1 ... 124.N communicating the length and/or content of the data packet.

The ping and pong packets may be of either equal or different respective bit lengths. In one embodiment, the communication circuits 24, 26 may dynamically size the ping and/or pong packets during operation. For example, a communication circuit 24, 26, e.g., as controlled by its respective control circuit 48, may dynamically set the bit length of the respective ping or pong packet that it transmits, and communicate the dynamically set packet bit length, i.e., the predetermined number of bits of the packet, to the other communication circuit 24, 26, such as by, e.g., including an indication of the dynamically set predetermined number of bits in a header of that packet. The other communication circuit 24, 26 may then dynamically adjust the predetermined number of bits that it is expecting to receive for the packet based on the received indication of the packet size, in order to evaluate whether the receive condition has been satisfied.

Similarly, the communication circuits 24, 26 also may dynamically set the predetermined time period associated with evaluating the receive condition for ping and/or pong packets. For example, a communication circuit 24, 26, e.g., as implemented by its respective control circuit 48, may dynamically set this time period based on the size of the respective ping or pong packet that it receives, such as a dynamically set size. The communication circuits 24, 26 may then use this dynamically set predetermined time period to evaluate whether the receive condition has been satisfied.

Although embodiments of ping-pong time division multiplexing may involve ping and pong packets including respective predetermined plurality of bits or symbols, in one embodiment one or more of the ping and pong packets may include only a single bit or symbol.

The communication system 20 may provide bi-directional communications across the isolation barrier 28 according to other types of time division multiplexing. Embodiments of the communication system 20 may provide bi-directional communications across the isolation barrier 32 according to a slotted time division multiplexing in which each of the first and second communication circuits 24, 26 may transmit data during periodically repeating time slots exclusively assigned to that communication circuit for transmission.

The communication system 20 may provide slotted time division multiplexing alternatively or in addition to ping-pong time division multiplexing. For example, embodiments of the communication system 20 depicted in FIGS. 1 and 2 may be configured to provide the transmit clock signal TCLK generated or received by the clock circuit 86 to any and/or all components of the first and second communication circuits 24, 26, alternatively or in addition to the receive circuit 60 operating to derive a clock signal DCLK from the received data, and operation of the state machines 80 correspondingly adapted, to serve as a common time base to enable slotted time division multiplexing.

FIG. 9(a) is a timing diagram depicting an embodiment of an assignment of a periodically repeating sets of time slots to the first and second communication circuits 24, 26. The first communication circuit 24 may be assigned a first set of time slots S1 ... SN aligned to start at selected times T11, T12 repeating at a selected time period. The second communication circuit 26 may be assigned a second set of time slots SN+1 ... SN+M aligned to start at selected times T21, T22 repeating at a selected time period. The first and second sets of time slots may include a plurality of time slots having a duration sufficient for transmitting one or more bits or symbols.

The first and second sets of time slots may be aligned to a common time base. For example, the first and second sets of time slots may be aligned to a clock signal common to or referenced by each of the first and second communication circuits 24, 26. FIG. 9(b) is a signal diagram depicting an embodiment of a clock signal common to or referenced by the first and second communication circuits 24, 26 to which the first and second sets of time slots may be aligned.

In operation, during one or more occurrences of the first set of time slots S1 ... SN, the first communication circuit 24 may operate in a transmit state of its state machine to transmit a framed data packet across the isolation barrier 28 using the isolator 32. During this time period, the second communication circuit 26 may operate in a receive state of its state machine to receive the transmitted data. During one or more occurrences of the second set of time slots SN+1 ... SN+M, the second communication circuit 26 may operate in a transmit state of its state machine to transmit a framed data packet across the isolation barrier 28 using the isolator 32. During this time period, the first communication circuit 24 may operate in a receive state of its state machine to receive the transmitted data.

The common clock signal may be used by the first and second communication circuits may be the transmit clock signal TCLK. In one embodiment, the common clock signal may be separately generated in a synchronized manner by the clock circuits 86 in the first and second communication circuits 24, 26 as the local transmit clock signal TCLK. The clock circuits 86 may each generate transmit clock signals TCLK having a frequency at a predetermined common frequency to within a specified accuracy. For example, to generate transmit clock signals TCLK at the predetermined common frequency, the clock circuits 86 may include components, such as laser trimmed resistors, that may be tuned so that the communication circuits 24, 26 generate transmit clock signals TCLK at the common frequency to within the specified accuracy. The transmit clock signals TCLK generated by the clock circuits 86 may also have a phase at a predetermined common phase to within a specified accuracy. For example, to generate transmit clock signals TCLK at the predetermined common phase, the communication circuits 24, 26 may communicate, such as across the isolation barrier using the isolator, phase synchronization information to each other to generate transmit clock signals TCLK at the common phase to within the specified accuracy.

Figure 10:
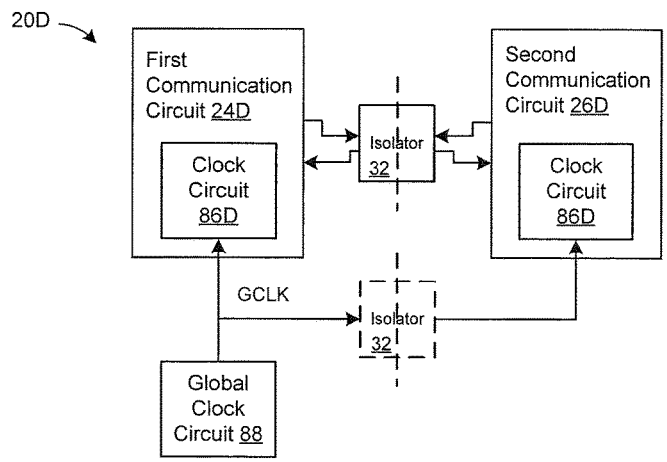
FIG. 10 is a circuit schematic depicting another embodiment of the communication system.

In another embodiment, the common clock signal may be provided to one or more of the first and second communication circuits. FIG. 10 depicts an embodiment of the communication system 20D (where for purposes of clarity only certain details of the first and second communication circuits such as the clock circuit 86D are shown) that may include a global clock circuit 88 and optionally one or more additional isolators 32 and isolation barriers 28. The global clock circuit 88 may generate the common clock signal GCLK and provide the common clock signal GCLK to the first and second communication circuits 24, 26. The global clock circuit 88 may optionally be part of one of the first and second isolated systems, provide the common clock signal GCLK directly to the communication circuit in that system, and provide the common clock signal GCLK to the other communication circuit in the other isolated system by utilizing the additional isolator 32. Other configurations of the global clock circuit 88 are also possible, such as it being located in a system other than the first and second isolated systems.

In yet another embodiment, one of the first or second communication circuits 24, 26 may generate its transmit clock signal TCLK as the common clock signal and the other of the first and second communication circuits 24, 26 may include a phase-locked-loop to generate the common clock signal on that communication circuit as a clock signal derived from the data signals it receives. The received data signals may be aligned to the transmit clock signal on the communication circuit from which they were received, and the phase-locked-loop may lock onto bits or data symbols of the received data signals to generate the common clock signal.

The first and second sets of time slots S1 . . . SN, SN+1 . . . SN+M assigned to the first and second communication circuits 24, 26 may be of equal collective duration, such that the first and second communication circuits 24, 26 essentially equally share time on the isolator 32 for data communication purposes. Alternatively, the first and second sets of time slots S1 . . . SN, SN+1 . . . SN+M assigned to the first and second communication circuits 24, 26 may be of unequal collective duration, such that the first and second communication circuits 24, 26 unequally share time on the isolator 32 for data communication purposes.

The communication circuits 24, 26 may assign packets framed by the framing, timing and logic circuits 48 to the first and second sets of time slots S1 . . . SN, SN+1 . . . SN+M in different ways. In one embodiment, the communication circuits 24, 26 may transmit a packet framed by the framing, timing and logic circuits 48, such as including one or more bits from each of the input data signals ID1 . . . IDM, to the other communication circuit in a single contiguous instance of a corresponding set of time slots S1 . . . SN, SN+1 . . . SN+M.

The communication system 20 also may utilize other types of multiplexing to provide communication across the isolator. Embodiments of the communication system 20 may provide communication across the isolation barrier 28 utilizing amplitude multiplexing in which a plurality of bits of data are encoded for transmission over the isolator 32 as an amplitude of a pulse or other single data symbol.

Embodiments of the communication system 20 may provide amplitude multiplexing either in addition to or alternatively to time division multiplexing. For example, embodiments of the communication system 20, 20B depicted in FIGS. 1 and 2 may be configured to provide amplitude multiplexing in addition to time division multiplexing. In another example, embodiments of the communication system 20, 20B depicted in FIGS. 1 and 2 may be configured to provide amplitude multiplexing alternatively to bi-directional time division multiplexing, such as, e.g., by providing only unidirectional communication across the isolation barrier. In such unidirectional embodiments, one of the transmit or receive modules may optionally be omitted from the communication circuit 24, 26 depending on whether the communication circuit 24, 26 is configured to receive or transmit.

Figure 11:
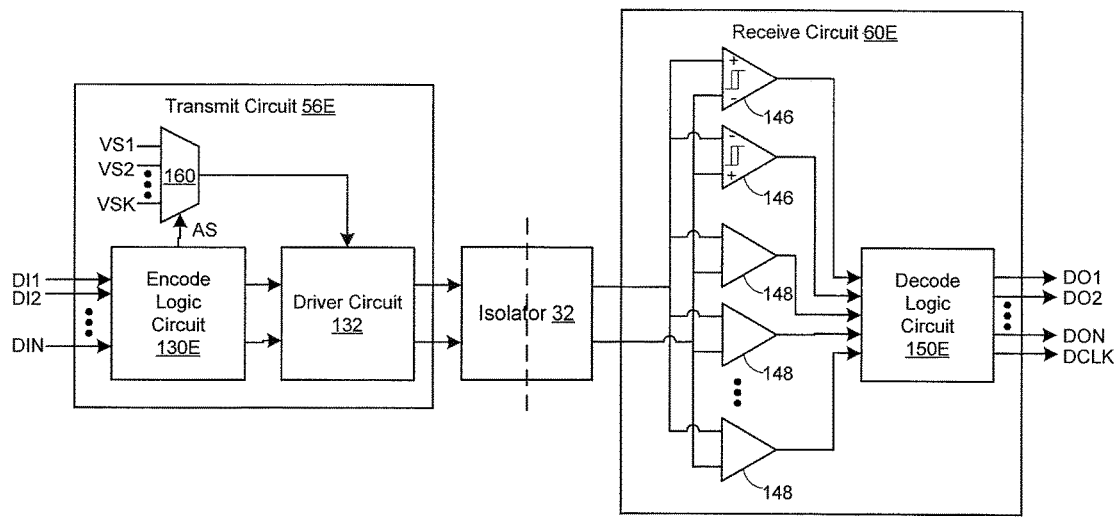
FIG. 11 is a circuit schematic depicting embodiments of the transmit circuit, isolator, and receive circuit providing amplitude multiplexing.

FIG. 11 depicts an embodiment of a portion of the communication system 20 showing further details of embodiments of the transmit circuit 56E and the receive circuit 60E configured to provide amplitude multiplexing.

The transmit circuit 56E may include an embodiment of the encode logic circuit 130E, a multiplexer 160, and a driver circuit 132. The transmit circuit 56E may encode a plurality of bits of the framed packet into an amplitude of a signal, such as a pulse or other symbol, for being driven onto the isolator 32. The encode logic circuit 130E may receive the framed packet as a plurality of bits DI1 . . . DIN from the framing circuit 76, and output an amplitude selection signal AS as a function of at least a plural subset of the plurality of bits DI1 . . . DIN to the multiplexer 160, and a differential driver input signal to the driver circuit 132. The plurality of received bits may include a number N of bits equal to the number of bits of the framed packet. The multiplexer 160 may receive a plurality of supply voltages VS1 . . . VSK having different magnitudes, and output a single selected one VS of the plurality of supply voltages VS1 . . . VSK as a function of the amplitude select signal AS. The transmit circuit 56E may encode the framed packet into either a single data symbol or a plurality of data symbols. In one embodiment, to encode the framed packet into a single pulse or other data symbol, the plurality of supply voltages VS1 . . . VSK may be of a number K equal to or greater than a number $2^N$ of data levels associated with N bits of the packet, and each of the N bits may multiplexed into a single pulse or other data symbol for transmission. In another embodiment, to encode the framed packet into a plurality of pulses or other data symbols, the plurality of supply voltages VS1 . . . VSK may be of a number K less than a number $2^N$ of data levels associated with N bits to be amplitude multiplexed, and the N bits may multiplexed into a plurality of pulses or other data symbols for transmission. The driver circuit 132 may receive the driver input signals and the selected supply voltage VS, and drive the isolator 32 with a pulse or other single data symbol at the selected amplitude in response to transmit the selected subset of bits of the framed packet.

The receive circuit 60E may include a plurality of differential threshold comparators 148, the pair of comparators 146, and an embodiment of the decode logic circuit 150E. The plurality of differential threshold comparators 148 may receive and compare the differential coil output signal to a plurality of threshold voltages V1 . . . VM, and output corresponding comparison signals responsive to the amplitude of the received signal. The comparators 146 may receive the cross coupled differential coil output signal and output detection signals. The decode logic circuit 150E may receive the comparison signals and detection signals and generate a plurality of output data packet signals DO1 . . . DON, representing the transmitted multiplexed plurality of bits corresponding to the amplitude of the received signal, and optionally a clock signal DCLK derived from the received data.

As discussed above, amplitude multiplexing may be combined with time division multiplexing. In an illustrative example, an embodiment of the first communication circuit 24 may frame N bit packets, such as, e.g., 9 bit packets, and encode each N bit packet into a plurality of data symbols, such as, e.g., 3 symbols each encoding 3 bits into corresponding amplitudes, and transmit the 3 symbols as a ping packet to the second communication circuit 26. Similarly, an embodiment of the second communication circuit 26 may frame M bit packets, such as, e.g., 4 bit packets, and encode each M bit packet into a plurality of data symbols, such as, e.g., 2 symbols each encoding 2 bits into corresponding amplitudes, and transmit the 2 symbols as a pong packet to the first communication circuit 24. Note that the above packet bit lengths and number of bits per symbol are only illustrative, and other embodiments may utilize other packet bit lengths and number of bits per symbol.

Other embodiments of the transmit circuit 56, isolator 32, and receive circuit 60 that perform amplitude multiplexing may include circuit configurations and specific operation that differ from those depicted in and discussed above in regard to FIG. 11.

Figure 12:
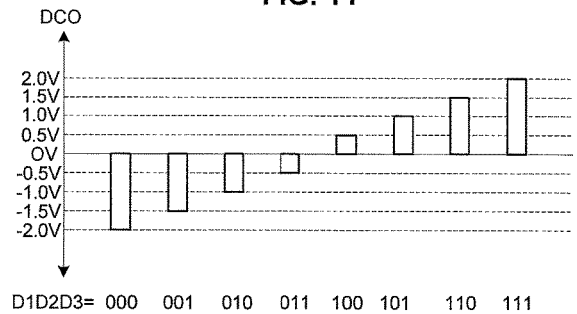
FIG. 12 is a diagram depicting embodiments of amplitude multiplexed signals of the communication system.

FIG. 12 depicts an exemplary correspondence of the amplitude of the received differential coil output to an encoding of N bits of input data for N=3.

The communication system 20 also may utilize yet other types of multiplexing to provide communication across the isolation barrier 28. The communication system 20 may provide communication across the isolation barrier 28 by utilizing frequency multiplexing in which a plurality of bits of data are encoded for transmission over the isolator as a frequency of an oscillation or other single data symbol. Embodiments of the communication system 20 may provide frequency multiplexing either in addition to or alternatively to time division multiplexing. For example, embodiments of the communication system 20, 20B depicted in FIGS. 1 and 2 may be configured to provide frequency multiplexing either in addition to or alternatively to bi-directional time division multiplexing.

Figure 13:
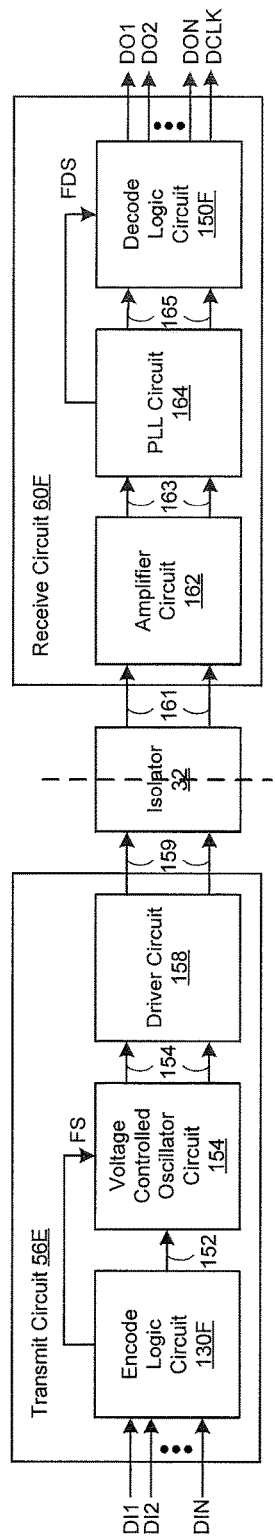
FIG. 13 is a circuit schematic depicting embodiments of the transmit circuit, isolator and receive circuit providing frequency division multiplexing.

FIG. 13 depicts an embodiment of a portion of the communication system 20 showing further details of embodiments of the transmit circuit 56F and the receive circuit 60F configured to provide frequency multiplexing.

The transmit circuit 56F may include an embodiment of the encode logic circuit 130F, a voltage controlled oscillator circuit 154, and a driver circuit 158. The encode logic circuit 130F may receive the framed packet as a plurality of bits DI1 . . . DIN from the framing circuit 76 and output an frequency selection signal FS as a function of at least a plural subset of the plurality of bits DI1 . . . DIN, and a timing signal 152, to the voltage controlled oscillator 154. The frequency selection signal FS may indicate a frequency, selected from a plurality of predetermined frequencies, corresponding to values of the selected subset of the plurality of received bits DI1 . . . DIN. The voltage controlled oscillator 154 may generate a driver input signal 154 having a frequency content as a function of the frequency selection signal FS. The driver circuit 158 may drive the isolator 32 with an oscillation or other single data symbol 159 at the selected frequency in response to the received driver input signal 154 to transmit the selected subset of bits of the framed packet.

The receive circuit 60F may include an amplifier circuit 162, a phase locked loop circuit 164, and a decode logic circuit 150F. The amplifier circuit 162 may receive and amplify or buffer the isolator output 161. The phase locked loop circuit 164 may receive the amplified or buffered isolator output signal 163 and generate a frequency detection signal FDS indicating the frequency of the received signal and a timing signal 165. The decode logic circuit 150F may receive the frequency detection signal FDS and timing signal 165 and generate a plurality of output data packet signals DO1 . . . DON, representing the transmitted multiplexed plurality of bits corresponding to the frequency of the received signal, and optionally a clock signal DCLK derived from the received data.

As discussed above, frequency multiplexing may be combined with time division multiplexing. In an illustrative example, an embodiment of the first communication circuit 24 may frame N bit packets, such as, e.g., 9 bit packets, and encode each N bit packet into a plurality of data symbols, such as, e.g., 3 symbols each encoding 3 bits into corresponding frequencies, and transmit the 3 symbols as a ping packet to the second communication circuit 26. Similarly, an embodiment of the second communication circuit 26 may frame M bit packets, such as, e.g., 4 bit packets, and encode each M bit packet into a plurality of data symbols, such as, e.g., 2 symbols each encoding 2 bits into corresponding frequencies, and transmit the 2 symbols as a pong packet to the first communication circuit 24. Note that the above packet bit lengths and number of bits per symbol are only illustrative, and other embodiments may utilize other packet bit lengths and number of bits per symbol.

The communication system 20 also may provide directional communication across the isolation barrier 28 by utilizing phase multiplexing in which a plurality of bits of data are encoded for transmission over the isolator as a phase of an oscillation or other single data symbol. Embodiments of the communication system 20 may provide phase multiplexing either in addition to or alternatively to time division multiplexing. For example, embodiments of the communication system 20, 20B depicted in FIGS. 1 and 2 may be configured to provide phase multiplexing either in addition to or alternatively to bi-directional time division multiplexing.

Figure 14:
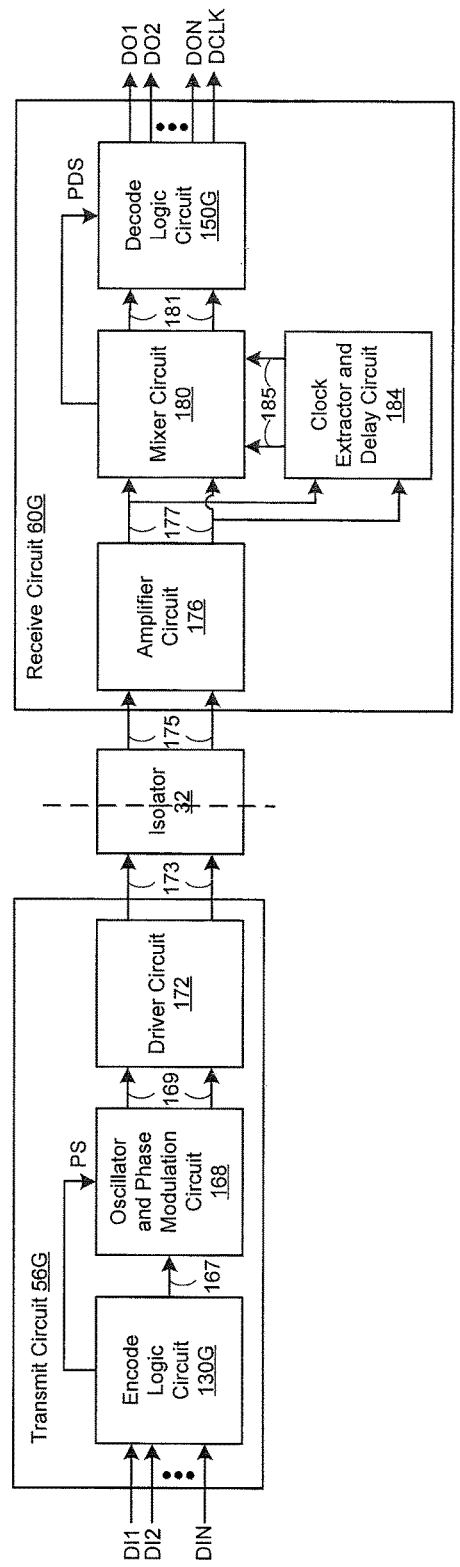
FIG. 14 is a circuit schematic depicting embodiments of the transmit circuit, isolator and receive circuit providing phase multiplexing.

FIG. 14 depicts an embodiment of a portion of the communication system 20 showing further details of embodiments of the transmit circuit 56G and the receive circuit 60G configured to provide phase multiplexing.

The transmit circuit 56G may include an embodiment of the encode logic circuit 130G, an oscillator and phase modulation circuit 168, and a driver circuit 172. The encode logic circuit 130G may receive the framed packet as a plurality of bits DI1 . . . DIN from the framing circuit 76 and output a phase selection signal PS as a function of at least a plural subset of the plurality of bits DI1 . . . DIN, and a timing signal 167, to the voltage controlled oscillator 168. The phase selection signal PS may indicate a phase, selected from a plurality of predetermined phases, corresponding to values of the selected subset of the plurality of received bits. The oscillator and phase modulation circuit 168 may generate driver input signals 169 having a phase content as a function of the phase selection signal PS. The driver circuit 172 may drive the isolator 32 with an oscillation or other single data symbol 173 at the selected phase in response to the driver input signal 169 to transmit the selected subset of bits of the framed packet.

The receive circuit 60G may include an amplifier circuit 176, a mixer circuit 180, a clock extractor and delay circuit 184 and a decode logic circuit 150G. The amplifier circuit 176 may receive and amplify or buffer the isolator output 175. The mixer circuit 180 may receive the amplified or buffered isolator output signal 177 and a delayed version 185 of a clock extracted from the amplified or buffered isolator output signal 177 and generate a phase detection signal PDS indicating the phase of the received signal and a timing signal 181. The clock extractor and delay circuit 184 may receive the amplified or buffered isolator output signal 177 and generate the delayed version 185 of the clock extracted from the amplified or buffered isolator output signal 177.

The decode logic circuit 150G may receive the phase detection signal PDS and timing signal 181 and generate a plurality of output data packet signals DO1 . . . DON, representing the transmitted multiplexed plurality of bits corresponding to the phase of the received signal, and optionally a clock signal DCLK derived from the received data.

As discussed above, phase multiplexing may be combined with time division multiplexing. In an illustrative example, an embodiment of the first communication circuit 24 may frame N bit packets, such as, e.g., 9 bit packets, and encode each N bit packet into a plurality of data symbols, such as, e.g., 3 symbols each encoding 3 bits into corresponding phases, and transmit the 3 symbols as a ping packet to the second communication circuit 26. Similarly, an embodiment of the second communication circuit 26 may frame M bit packets, such as, e.g., 4 bit packets, and encode each M bit packet into a plurality of data symbols, such as, e.g., 2 symbols each encoding 2 bits into corresponding phases, and transmit the 2 symbols as a pong packet to the first communication circuit 24. Note that the above packet bit lengths and number of bits per symbol are only illustrative, and other embodiments may utilize other packet bit lengths and number of bits per symbol.

The components of the communication system 20 may be distributed between integrated circuits in a variety of ways. In one embodiment, the first communication circuit may 24 be part of a first integrated circuit (e.g., located on a first integrated circuit substrate), and the isolator 32, isolation barrier 28 and second communication circuit 26 may be part of a second integrated circuit (e.g., located on a second integrated circuit substrate). Alternatively, the first communication circuit 24 may be part of a first integrated circuit (e.g., located on a first integrated circuit substrate), the isolator 32 and isolation barrier 28 may be part of a second integrated circuit (e.g., located on a second integrated circuit substrate), and the second communication circuit 26 may be part of a third integrated circuit (e.g., located on a third integrated circuit substrate). The data sources and sinks may be part of one or more of the integrated circuits containing the communication circuits 24, 26, as part of at least one additional integrated circuit, or be located elsewhere.

The communication system 20 may utilize embodiments of amplitude multiplexing, frequency division multiplexing or phase multiplexing in combination with any of the embodiments of time division multiplexing. That is, the communication system 20 may time division multiplex amplitude, frequency or phase multiplexed data from the first and second communication circuits in any of the ping-pong or slotted time division embodiments discussed above. In one example, the communication system 20 may time division multiplex the packets from the first and second communication circuit as ping-pong packets where each packet may be amplitude multiplexed to a single symbol or a plurality of symbols less in number than would otherwise be the case without the amplitude multiplexing.

Although embodiments of the communication system 20 or components thereof discussed herein may utilize edge based data delineation, in which data is indicated in the data transmission by transitions between levels of a transmission signal, such as, e.g., inductive isolators utilizing pulse based data transmissions, other embodiments of the communication system 20 or components thereof may utilize level based data delineation, in which data is indicated in the data transmission according to a level of the transmission signal at a specific time(s) or time period(s).

Although embodiments of the communication system 20 or components thereof discussed herein may utilize differential data signals, other embodiments of the communication system 20 or components thereof may utilize single-ended data signals.

Additional embodiments of the communication system 20 and first and second communication circuits 24, 26 are possible. For example, any feature of any of the embodiments of the communication system 20 or first or second communication circuits 24, 26 described herein may optionally be used in any other embodiment of the communication system 20 or first or second communication circuits 24, 26. Also, embodiments of the communication system 20 and first and second communication circuits 24, 26 may optionally include any subset of the components or features of the communication system 20 and first and second communication circuits 24, 26 described herein.

What is claimed is:

1. A communication circuit for transmitting and receiving data across an isolator bridging an isolation barrier, comprising:
   an input circuit configured to receive a plurality of input data channels;
   a framing circuit coupled to the input circuit and configured to frame an input data packet from the plurality of input data channels;
   a transmit circuit positioned on a first side of the isolator and configured to drive onto the isolator a first data signal comprising the input data packet;
   a receive circuit positioned on the first side of the isolator and configured to receive a second data signal from the isolator; and
   a control circuit configured to control the transmit circuit and the receive circuit to provide time division multiplexing of the first data signal and the second data signal,
   wherein the control circuit transitions to a transmit state, in which the transmit circuit is configured to drive the first data signal onto the isolator, from a receive state, in which the receive circuit is configured to receive the second data signal from the isolator, in response to detecting at least one of a data condition or a timing condition.

2. The communication circuit of claim 1, wherein the control circuit transitions to the receive state from the transmit state in response to detecting at least one of a second data condition or a second timing condition.

3. The communication circuit of claim 1, wherein the control circuit sets the data condition in response to a packet length indicated by the second data signal.

4. The communication circuit of claim 1, wherein the control circuit sets the timing condition based on an amount of data to be received by the receive circuit.

5. The communication circuit of claim 1, wherein the isolator is a single isolator device having a single set of terminals to receive the first data signal and output the second data signal.

6. The communication circuit of claim 1, wherein the isolator is an inductive isolator device including a first coil on a first side of the isolation barrier and a second coil on a second side of the isolation barrier, the first coil having a single set of terminals.

7. The communication circuit of claim 1, wherein the control circuit includes a state machine corresponding to the transmit state and the receive state.

8. The communication circuit of claim 1, wherein the control circuit is configured to control the transmit circuit and the receive circuit to provide ping-pong time division multiplexing, wherein the control circuit is configured to:

control the transmit circuit to transmit the first data signal during a periodically repeating first set of assigned time slots; and control the receive circuit to receive the second data signal during a periodically repeating second set of assigned time slots.

9. The communication circuit of claim 1, wherein the transmit circuit is configured to multiplex a plurality of bits of the input data packet into an amplitude, a frequency, or a phase of a single data symbol and to drive the data symbol onto the isolator.

10. A method for transmitting and receiving data across an isolator bridging an isolation barrier, comprising:

receiving, by an input circuit of a communication circuit, a plurality of input data channels;

framing, by a framing circuit of the communication circuit, an input data packet from the plurality of input data channels;

receiving, by a receive circuit of the communication circuit, a first data signal from the isolator at a first side of the isolation barrier;

detecting, by a control circuit of the communication circuit, at least one of a data condition or a timing condition; and driving, by a transmit circuit of the communication circuit, a second data signal comprising the input data packet onto the isolator at the first side of the isolation barrier in response to detecting the at least one of the data condition or the timing condition.

11. The method of claim 10, further comprising transitioning from the driving to the receiving in response to detecting at least one of a second data condition or a second timing condition.

12. The method of claim 10, further comprising setting the data condition to represent a packet length indicated by the second data signal.

13. The method of claim 10, further comprising setting the timing condition based on an amount of data to be received by the receive circuit.

14. The method of claim 10, wherein the isolator is a single isolator device having a single set of terminals to output the first data signal and receive the second data signal.

15. The method of claim 10, wherein the isolator is an inductive isolator device including a fist coil on a first side of the isolation barrier and a second coil on a second side of the isolation barrier, the first coil having a single set of terminals.

16. The method of claim 10, wherein the driving and the receiving a first data signal provide ping-pong time division multiplexing, wherein the receiving of the first data signal occurs during a periodically repeating first set of assigned time slots, and the driving of the second data signal occurs during a periodically repeating second set of assigned time slots.

17. A communication circuit for transmitting and receiving data across an isolator bridging an isolation barrier, comprising:

an input circuit configured for receiving a plurality of input data channels;

a framing circuit configured for framing an input data packet from the plurality of input data channels;

a transmit circuit configured for driving a first data signal comprising the input data packet onto the isolator at a first side of the isolation barrier;

means for receiving a second data signal from the isolator at the first side of the isolation barrier; and a control circuit configured to control the transmit circuit and the means for receiving to provide time division multiplexing of the first data signal and the second data signal, wherein the control circuit transitions to a transmit state, in which the transmit circuit is configured to drive the first data signal onto the isolator, from a receive state, in which the means for receiving is configured to receive the second data signal from the isolator, in response to detecting at least one of a data condition or a timing condition.

18. The communication circuit of claim 17, wherein the control circuit transitions to the receive state from the transmit state in response to detecting at least one of a second data condition or a second timing condition.

19. The communication circuit of claim 17, wherein the control circuit is configured to set the data condition to represent a packet length indicated by the second data signal.

20. The communication circuit of claim 17, wherein the control circuit is configured to set the timing condition based on an amount of data to be received by the means for receiving the second data signal.

21. The communication circuit of claim 1, wherein the data condition is based on the receive circuit receiving a predetermined number of bits or symbols of the second data signal.

22. The communication circuit of claim 1, wherein the timing condition is based on passage of a predetermined time period in the receive state.

23. The method of claim 10, wherein the data condition is based on receiving a predetermined number of bits or symbols of the first data signal.

24. The method of claim 10, wherein the timing condition is based on passage of a predetermined time period.

25. The communication circuit of claim 17, wherein the data condition is based on receiving a predetermined number of bits or symbols of the second data signal, and wherein the timing condition is based on passage of a predetermined time period in the receive state.

* * * * *